US012297672B1

(12) United States Patent
Ellis

(10) Patent No.: US 12,297,672 B1
(45) Date of Patent: May 13, 2025

(54) COMBINATION LOCK FOR THE REAR CARGO DOORS OF A VEHICLE

(71) Applicant: David Ellis, Fort Lauderdale, FL (US)

(72) Inventor: David Ellis, Fort Lauderdale, FL (US)

( * ) Notice: Subject to any disclaimer, the term of this patent is extended or adjusted under 35 U.S.C. 154(b) by 259 days.

(21) Appl. No.: 17/890,800

(22) Filed: Aug. 18, 2022

(51) Int. Cl.
*E05B 83/02* (2014.01)

(52) U.S. Cl.
CPC .................................... *E05B 83/02* (2013.01)

(58) Field of Classification Search
CPC .......... E05B 83/02; E05B 83/08; E05B 83/12; E05B 83/42; E05B 37/02; E05B 65/06; E05B 77/46; Y10S 292/32; Y10S 292/15; Y10T 292/1025; Y10T 292/34; Y10T 292/37; Y10T 292/23; E05C 19/18; E05C 19/184; E05C 7/00; E05C 17/047
See application file for complete search history.

(56) References Cited

U.S. PATENT DOCUMENTS

| | | | |
|---|---|---|---|
| 4,083,424 A | 4/1978 | von den Stemmen et al. | |
| 4,161,870 A | 7/1979 | Barnes | |
| 2005/0099018 A1* | 5/2005 | Witchey | E05B 67/38 292/218 |
| 2009/0145178 A1* | 6/2009 | Nave | E05B 37/025 70/21 |
| 2009/0217718 A1* | 9/2009 | Porter | E05C 19/186 292/336.3 |
| 2018/0010369 A1* | 1/2018 | Witchey | E05C 19/18 |
| 2020/0399941 A1* | 12/2020 | Grant | E05C 19/184 |

* cited by examiner

*Primary Examiner* — Gilbert Y Lee
*Assistant Examiner* — Yahya Sidky
(74) *Attorney, Agent, or Firm* — Sanchelima & Associates, P.A.; Jesus Sanchelima; Christian Sanchelima

(57) ABSTRACT

A combination lock for the rear cargo doors of a vehicle including a body assembly and a locking assembly. The body assembly includes a body. The body is T-shaped. The body is arranged between the bars of the rear cargo doors to prevent opening of the doors. The locking assembly includes locking elements. The locking elements can be locked or unlocked in a predetermined position through dials. The locking elements can be inserted into the body to remove the combination lock from the rear cargo doors of the vehicle when the locking elements are unlocked.

2 Claims, 2 Drawing Sheets

COMBINATION LOCK FOR THE REAR CARGO DOORS OF A VEHICLE

II. BACKGROUND OF THE INVENTION

1. Field of the Invention

The present invention relates to a combination lock for the rear cargo doors of a vehicle and, more particularly, to a combination lock for the rear cargo doors of a vehicle that allows to lock the rear cargo of a vehicle using an attaching.

2. Description of the Related Art

Several designs for a combination lock for the rear cargo doors of a vehicle have been designed in the past. None of them, however, include retractable locking element including dials to be unlocked.

Applicant believes that a related reference corresponds to U.S. Pat. No. 4,083,424 issued for a push button combination lock for securing the rear access door of a truck. Applicant believes that another related reference corresponds to U.S. Pat. No. 4,161,870 issued for an electromechanical device for locking and unlocking mobile cargo-container doors. None of these references, however, teach of a combination lock for the rear doors with a set of four combination dials which are integrated into a road member which is used to secure the back gate of a cargo vehicle.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a combination lock for the rear cargo doors of a vehicle that includes a locking element for locking the gate of the rear cargo doors of a vehicle.

It is another object of this invention to provide a combination lock for the rear cargo doors of a vehicle that includes combination dials to lock and unlock the locking element.

It is still another object of the present invention to provide a combination lock for the rear cargo doors of a vehicle that includes a road member to secure the cargo rear door.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

Figure 1:
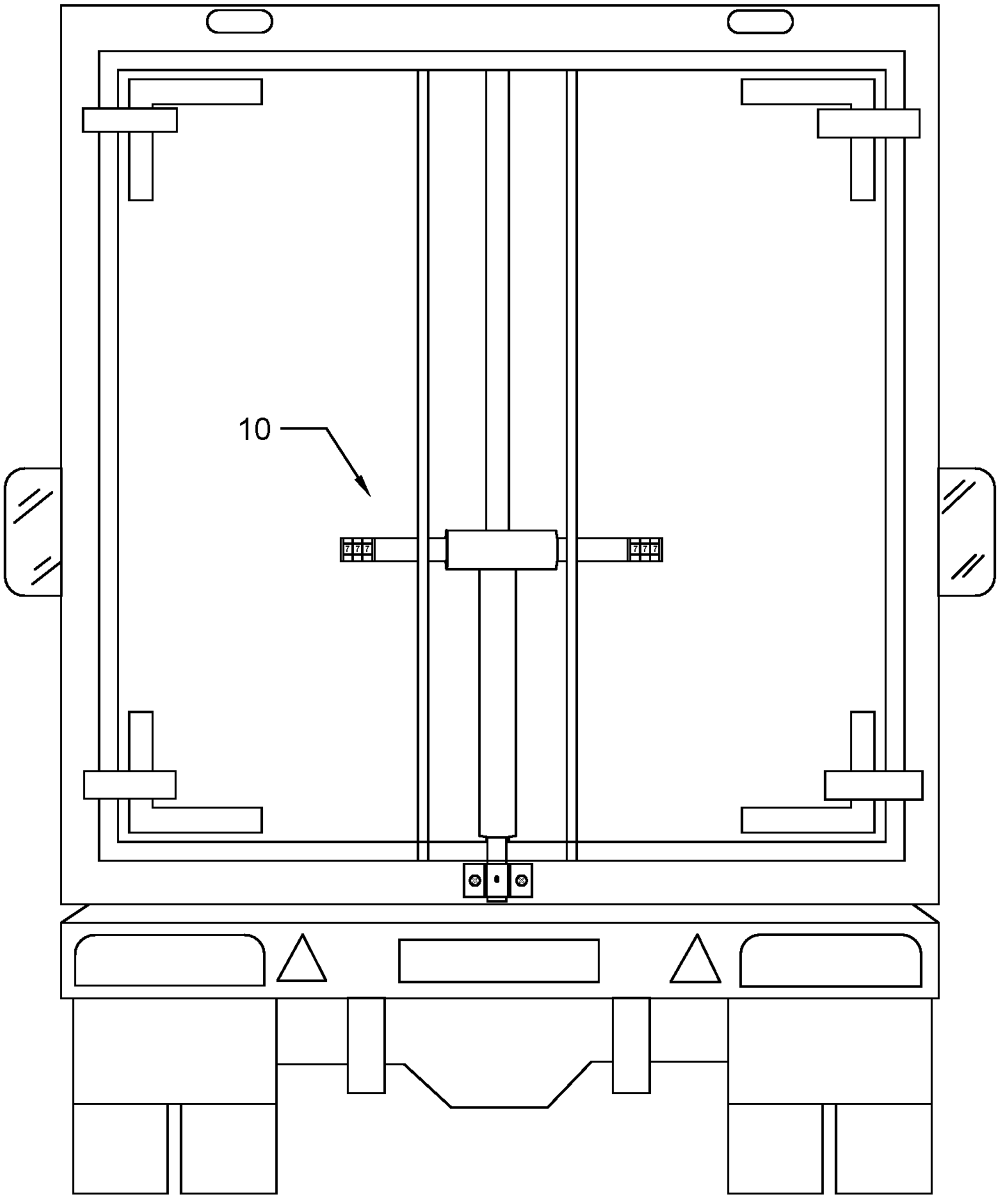

With the above and other related objects in view, the invention consists in the details of construction and combination of parts as will be more fully understood from the following description, when read in conjunction with the accompanying drawings in which:

FIG. 1 represents an isometric operational view of the present invention 10 locking the rear door of a cargo vehicle.

Figure 2:
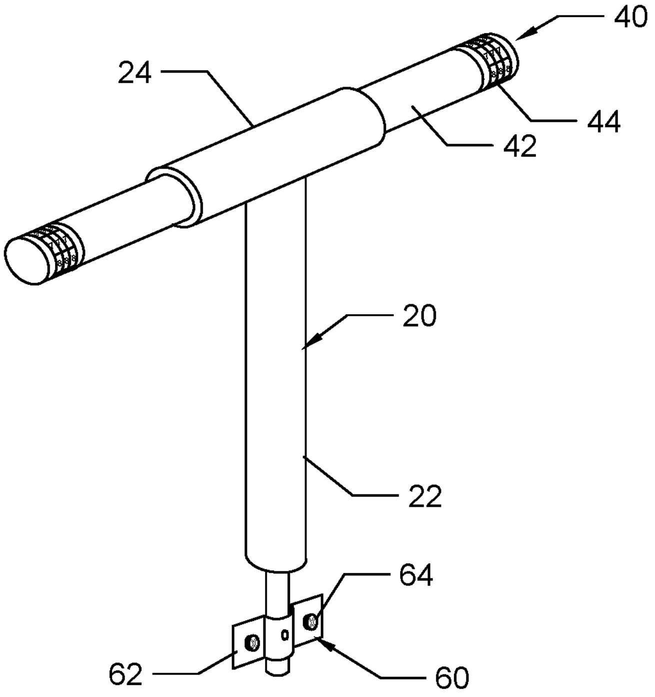

FIG. 2 shows an isometric view of the present invention 10 in a closed configuration. The present invention 10 includes a body assembly 20, a locking assembly 40 and a fixing assembly 60.

Figure 3:
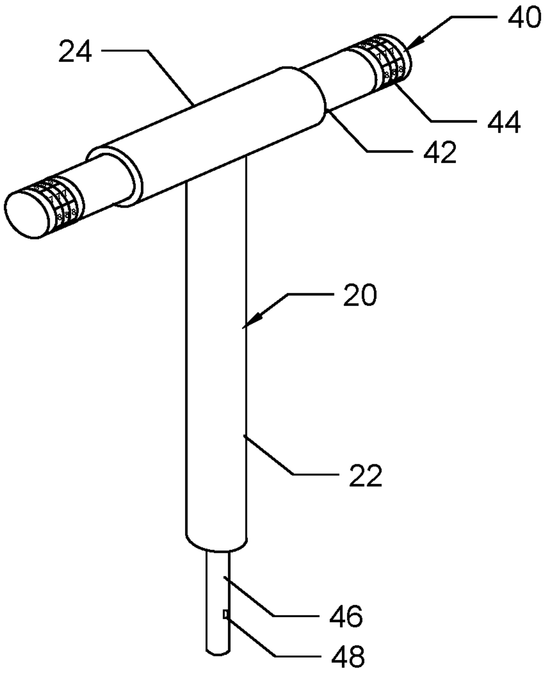

FIG. 3 is an illustration of an isometric view of the body assembly 20 and the locking assembly 40.

V. DETAILED DESCRIPTION OF THE EMBODIMENTS OF THE INVENTION

Referring now to the drawings, where the present invention is generally referred to with numeral 10, it can be observed that it basically includes a body assembly 20, a locking assembly 40 and a fixing assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The body assembly 20 may include a vertical element 22 and a horizontal element 24. The vertical element 22 may have a cylindrical shape. It also may be suitable for the vertical element 22 to have a rectangular shape, a triangular shape, or any other suitable shape. The vertical element 22 may be hollow. The vertical element 22 may be made of metal. It also may be suitable for the vertical element 22 to be made of plastic, wood, or any other suitable material. A central portion of the horizontal element 24 may be connected to the vertical element 22 defining a T-shaped body. The horizontal element 24 may have a cylindrical shape. It also may be suitable for the vertical element 22 to have a rectangular shape, a triangular shape, or any other suitable shape. The vertical element 22 may be hollow. The vertical element 22 may be made of metal. It also may be suitable for the vertical element 22 to be made of plastic, wood, or any other suitable material.

The locking assembly 40 may include horizontal locking elements 42 and a vertical locking element 46. Each of the horizontal locking elements 42 may be located on the distal and proximal ends of the horizontal element 24. The horizontal locking elements 42 may be made of metal. It also may be suitable for the horizontal locking elements 42 to be made of plastic, wood, or any other suitable material. The horizontal locking elements 42 may have a cylindrical shape. It also may be suitable for the horizontal locking elements 42 to have a rectangular shape, a triangular shape, or any other suitable shape. The horizontal locking elements 42 may be suitable to slide into the horizontal element 24. The horizontal locking elements 42 may include dials 44. The dials 44 may be combination dials labeled from zero to nine. The dials 44 may rotate to set a predetermined combination of numbers. The predetermined combination of numbers may unlock the horizontal locking elements 42 to be introduced into the horizontal element 24. The horizontal locking elements 42 may be fixed in a predetermined position when the predetermined combination of numbers is not dial. Each of the horizontal locking elements 42 may have a different predetermined combination of numbers.

The vertical locking element 46 may have a cylindrical shape. It also may be suitable for the vertical locking element 46 to have a rectangular shape, a triangular shape, or any other suitable shape. The vertical locking element 46 may be made of metal, plastic, or any other suitable material. The vertical locking element 46 may include a prong 48. The prong 48 may be used to fix the vertical locking element 46 to the fixing assembly 60. The prong 48 may be released or fixed in a predetermined position to fix or release the vertical locking element 46 from the fixing assembly 60. In one embodiment the vertical locking element 46 may be unlocked to be introduced into the vertical element 22. In another embodiment the vertical locking element 46 is fixed to the vertical element 22 and the prong 48 is introduced into the vertical locking element 46 to release the vertical locking element 46 from the fixing assembly 60. The prong 48 may be fixed in a predetermined position engaged with the fixing assembly 60 when locked. To lock or unlock the prong 48 any of the dials 44 may be used.

The fixing assembly 60 may include a fixing element 62. The fixing element 62 may be made of metal, plastic, or any other suitable material. The fixing element 62 may have a central portion, a left side, and a right side. The central portion of the fixing element 62 may have a semicircular shape. The central portion of the fixing element 62 may be suitable to receive the vertical locking element 46 therethrough. The central portion of the fixing element 62 may have an opening. The opening of the central portion of the fixing element 62 may be suitable to receive the prong 48 therethrough when the vertical locking element 46 is locked. The left side and the right side of the locking element 46 may be planar. The left side and the right side of the locking element 46 may have a rectangular shape. The left side and the right side of the locking element 46 may be suitable to receive fasteners 64. The left side and the right side of the fixing element 62 may be used to fix the fixing element 62 to a rear bottom portion of the rear cargo doors of a vehicle. The fixing element 62 may be fixed from inside of the vehicle. In a preferred embodiment the fixing element 62 may be fixed to the rear cargo doors of the vehicle and the vertical locking element 46 may be inserted into the fixing element. As best illustrated in FIG. 1 the present invention 10 may be arranged between the bars of the rear cargo doors of the vehicle. The present invention 10 may keep locked and prevent opening of the cargo doors of the vehicle. The present invention 10 may be unlocked from the fixing element 62 and may move out of the bars of the rear cargo doors when dialing the predetermined number on the dials 44. The horizontal locking elements 42 may be inserted into the horizontal element 24 to allow release of the body assembly 20 from the rear cargo doors of the vehicle.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A Combination lock for the rear cargo doors of a vehicle, comprising:

a body assembly, wherein said body assembly includes a body with a horizontal element and a vertical element, wherein said vertical element and said horizontal element are hollow and cylindrical, wherein the vertical element is connected to a central portion of the horizontal element, wherein said body is arranged between the bars of said rear cargo doors;

a locking assembly, wherein said locking assembly includes two horizontal locking elements, and a vertical locking element, wherein a first of the two horizontal locking elements is slidably insertable into a first end of the horizontal element, a second of the two horizontal locking elements is slidably inserted into a second end of the horizontal element, wherein the two horizontal locking elements include dials to selectively lock or unlock said two horizontal locking elements to prevent or allow opening of said doors, wherein the vertical locking element is slidably insertable into a bottom of said vertical element, said vertical locking element includes a prong; and a fixing assembly including a fixing element with a central portion, a left side and a right side, the central portion has a semicircular shape, wherein the vertical locking element is insertable into said central portion, the central portion has an opening to receive the prong therethrough to lock the vertical locking element, wherein the prong is unlocked or locked by the combination dials, the left side and the right side are planar, the left side and the right side are attached to the rear cargo doors by fasteners.

2. A Combination lock for the rear cargo doors of a vehicle, consisting of:

a body assembly, wherein said body assembly includes a body with a horizontal element and a vertical element, wherein said vertical element and said horizontal element are hollow and cylindrical, wherein the vertical element is connected to a central portion of the horizontal element, wherein said body is arranged between the bars of said rear cargo doors;

a locking assembly, wherein said locking assembly includes two horizontal locking elements, and a vertical locking element, wherein a first of the two horizontal locking elements is slidably insertable into a first end of the horizontal element, a second of the two horizontal locking elements is slidably inserted into a second end of the horizontal element, wherein the two horizontal locking elements include combination dials to selectively lock or unlock said two horizontal locking elements to prevent or allow opening of said doors, wherein the vertical locking element is slidably insertable into a bottom of said vertical element, said vertical locking element includes a prong; and a fixing assembly including a fixing element with a central portion, a left side and a right side, the central portion has a semicircular shape, wherein the vertical locking element is insertable into said central portion, the central portion has an opening to receive the prong therethrough to lock the vertical locking element, wherein the prong is unlocked or locked by the combination dials, the left side and the right side are planar, the left side and the right side are attached to the rear cargo doors by fasteners.

* * * * *